United States Patent
Krueger

(10) Patent No.: US 9,618,147 B2
(45) Date of Patent: Apr. 11, 2017

(54) CONNECTING ASSEMBLY AND METHOD FOR PRODUCING A CONNECTING ASSEMBLY

(75) Inventor: Manfred Krueger, Buedingen (DE)

(73) Assignee: NORMA GERMANY GMBH, Maintal (DE)

(*) Notice: Subject to any disclaimer, the term of this patent is extended or adjusted under 35 U.S.C. 154(b) by 636 days.

(21) Appl. No.: 13/346,343

(22) Filed: Jan. 9, 2012

(65) Prior Publication Data

US 2012/0187677 A1    Jul. 26, 2012

(30) Foreign Application Priority Data

Jan. 22, 2011 (DE) .................. 10 2011 009 230

(51) Int. Cl.
| | |
|---|---|
| *F16L 23/04* | (2006.01) |
| *F16L 23/16* | (2006.01) |
| *F16L 23/22* | (2006.01) |
| *F01N 13/18* | (2010.01) |

(52) U.S. Cl.
CPC .......... *F16L 23/04* (2013.01); *F01N 13/1827* (2013.01); *F16L 23/16* (2013.01); *F16L 23/162* (2013.01); *F16L 23/22* (2013.01)

(58) Field of Classification Search
CPC ......... F16L 23/04; F16L 23/22; F16L 23/162; F16L 23/16; F01N 13/1827; E03C 1/0403; E03C 2001/0416
USPC .......................................... 285/406, 365–367
See application file for complete search history.

(56) References Cited

U.S. PATENT DOCUMENTS

| | | | |
|---|---|---|---|
| 1,607,943 A | | 11/1926 | Carson et al. |
| 2,426,423 A | | 8/1947 | Woolsey |
| 2,457,077 A | * | 12/1948 | Woolsey ............... F16L 23/08 |
| | | | 285/340 |
| 2,608,819 A | | 9/1952 | Moorehead et al. |
| 2,828,986 A | | 4/1958 | Mahoff et al. |
| 2,883,211 A | | 4/1959 | Grass |
| 3,129,021 A | | 4/1964 | Willis et al. |
| 4,185,858 A | | 1/1980 | Peash |
| 4,230,157 A | | 10/1980 | Larsen et al. |
| 4,360,227 A | | 11/1982 | Bridges |
| 5,257,834 A | * | 11/1993 | Zeidler et al. ............... 285/328 |

(Continued)

FOREIGN PATENT DOCUMENTS

| | | |
|---|---|---|
| CN | 1151203 | 6/1997 |
| DE | 1 918 038 | 6/1965 |

(Continued)

OTHER PUBLICATIONS

Russia Office action, dated Dec. 20, 2012 in related application No. 2012101706/06, along with an English-language translation thereof.

(Continued)

*Primary Examiner* — David E Sosnowski
*Assistant Examiner* — James Linford
(74) *Attorney, Agent, or Firm* — Greenblum & Bernstein, P.L.C.

(57) ABSTRACT

Connection assembly includes two pipe end sections arranged to face each other, a profiled clamp including a clamping band with a base and two tilted side walls with ends, and at least one perimeter pleat projecting outwards on each of the pipe end sections. The side walls are engagable with the pleats on sides of the pleats facing away from one another.

14 Claims, 3 Drawing Sheets

(56) References Cited

U.S. PATENT DOCUMENTS

| | | | |
|---|---|---|---|
| 6,030,005 A * | 2/2000 | Andersson et al. | 285/367 |
| 6,109,665 A * | 8/2000 | Meinig | 285/405 |
| 7,004,512 B2 * | 2/2006 | Antonelli et al. | 285/365 |
| 7,073,826 B2 * | 7/2006 | Meinig | 285/364 |
| 2008/0169649 A1 * | 7/2008 | Bruckner et al. | 285/365 |

FOREIGN PATENT DOCUMENTS

| | | | | |
|---|---|---|---|---|
| DE | 10 2009 007391 | | 8/2010 | |
| GB | 2097880 A | * | 11/1982 | ............ F16L 23/04 |
| JP | 54-089619 | | 6/1979 | |
| JP | 54-145019 | | 11/1979 | |
| JP | 58-082585 | | 6/1983 | |
| JP | 2-154886 | | 6/1990 | |
| JP | 7-248083 | | 9/1995 | |
| JP | H07248083 | | 9/1995 | |
| JP | 8-326971 | | 12/1996 | |
| JP | 8-338575 | | 12/1996 | |
| JP | 11-166676 | | 6/1999 | |
| JP | H11166676 | | 6/1999 | |
| JP | 2000-310368 | | 11/2000 | |
| JP | 2000-320760 | | 11/2000 | |
| JP | 2006-071052 | | 3/2006 | |
| SU | 701204 | | 10/1996 | |
| WO | WO 2006119913 A1 | * | 11/2006 | ............ F16L 23/036 |

OTHER PUBLICATIONS

Search report from E.P.O. that issued with respect to patent family member European Patent Application No. 11008902.6, mail date is Mar. 30, 2012, along with partial English-language translation.
Japan Office action in related application No. 2012-008776, dated Apr. 30, 2013 along with an English-language translation thereof.
Korean Office action in related application No. 10-2012-0006205, dated Jun. 24, 2013 along with an English-language translation thereof.
Chinese Office action in related application No. 201110436166.4, dated Feb. 12, 2014 along with an English-language translation thereof.
German Office Action dated Mar. 24, 2011 in counterpart German Application No. 20 2011 009 230.7-24 (with partial English language translation.

* cited by examiner

CONNECTING ASSEMBLY AND METHOD FOR PRODUCING A CONNECTING ASSEMBLY

CROSS-REFERENCE TO RELATED APPLICATIONS

The present application claims priority under 35 U.S.C. §119(a) of German Patent Application No. 10 2011 009 230.7 filed Jan. 22, 2011, the disclosure of which is expressly incorporated by reference herein in its entirety.

BACKGROUND OF THE INVENTION

1. Field of the Invention

The invention relates to a connecting assembly with two pipe end sections and a profiled clamp which has a clamping band with a base and two tilted side walls, between which an annular sealing element is arranged.

Furthermore, the invention relates to a method for producing a connecting assembly of this type.

2. Discussion of Background Information

Connecting assemblies of this type are used, for example, in the exhaust gas region of motor vehicles. A fluid-tight connection between different pipes or pipe end sections is normally necessary. The pipe end sections have hitherto been connected to one another with relatively complex flange and seal constructions. A flange is thereby first welded to the pipe end sections in a gas-tight manner; and subsequently, the pipe end sections are connected to one another with the aid of a connecting element, which overlaps the two flanges and draws the pipe end sections together. The connecting element thereby normally also has a sealing element, which is used to seal the pipe end sections. As a rule, an additional sealing chamber is thereby necessary to accommodate the sealing element.

The production of the gas-tight flange connection generally requires additional rotary parts and is relatively complex. The expenditure for producing a connection of this type is further increased by the provision and the design of a space for the sealing element.

SUMMARY OF THE EMBODIMENTS

Embodiments of the invention are directed to an improved connecting assembly. In a preferred embodiment, the connecting assembly has a simple construction. In an advantageous embodiment, the connecting assembly provides a fluid tight connection of the two pipe end sections.

Further the invention is directed to an improved connecting method.

Instead of, as in the past, requiring additional rotary parts in the form of flanges and attaching them to the pipe end sections, the pipe end sections are with at least one pleat projecting outwards. A pleat represents a region of the pipe end section which is deformed outwards and thus forms a perimeter boss around the pipe end section. Since the pleat is embodied in one piece with the pipe end section, there is no danger that a fluid can leak out at this point. The strength of the pipe end section is thereby increased by the deformation of the pipe end section with the pleat. A favorable component, such as a profiled clamp, can be manufactured in mass production and thereby used with the pleats. Essentially radial forces are transferred from the profiled clamped via the sealing element to the pipe end sections by tightening the profiled clamp, so that the sealing element is pressed tightly on the pipe end sections or at the ends of the pipe end sections and a connection point between the pipe end sections. At the same time, due to the tilted embodiment of the side walls, an axial force transfer takes place from the side walls to the pleats, wherein the pipe end sections are pressed together axially. Thus a compression of the seal and an axial pressing of the pipe end sections take place at the same time by tightening the profiled clamp. A fluid-tight connection can thus be achieved in a simple manner, while a release of the connection is prevented at the same time.

It is particularly preferred that the pipe end sections have an identical diameter and in particular bear against one another at the front face. The pipe end sections are thus laid flush against one another, as it were, and are then held together axially by the profiled clamp, which at the same time exerts a radial force on the sealing element, so that a fluid-tight connection is obtained. Due to the identical diameter of the pipe end sections the profiled clamp and in particular the sealing element can be embodied in a very simple manner.

Preferably, ends of the side walls are spaced radially apart from the pipe end sections. If the ends of the side walls are spaced radially apart from the pipe end sections even in the clamped state, it is ensured that the radial clamping forces of the profiled clamp act essentially on the sealing element and compress it. A transfer of force from the profiled clamp directly to the pipe end sections is thereby avoided. Instead the transfer of force takes place only on the pleats and the sealing element.

Preferably, the sealing element bears against the base and the side walls. In this manner, the sealing element can have recesses in particular in the region of the ends of the side walls. These recesses are now usable to pre-position the profiled clamp on the pleats. Otherwise a relatively large region is available for the transfer of force from the profiled clamp to the seal.

It is particularly preferred thereby for the recess to be smaller than the pleats. During tightening of the profiled clamp, the pleats are pressed into the recess, whereby a deformation of the sealing element takes place. This ensures a bearing of the sealing element in particular also against the insides of the pleats, which increases the security of the seal.

Preferably, a width of the base is smaller than the distance between the pleats. This ensures that the side walls always can exert an axial force on the pleats, so that the pipe end sections are pressed together axially. A distance between the ends of the side walls is then greater than the axial extension of the base. The side walls are thus arranged in a V-shaped manner with respect to one another, but with a flat base.

Preferably, the pleats have a straight region running in the radial direction. It is thereby ensured that the pleats have a sufficient radial extension, so that the ends of the side walls do not radially contact the pipe end sections even during tightening of the profiled clamp. At the same time, a sufficient compression of the sealing element is possible. The pleats can thereby have an extension in the radial direction, for example, which corresponds to approximately twice the pipe wall thickness of the pipe end sections.

In a preferred embodiment, the sealing element has an insert sleeve on a radial inside, which insert sleeve axially covers a gap between the pipe end sections. An insert sleeve of this type is produced, for example, from a relatively strong material, such as, e.g., a metal. The insert sleeve prevents the sealing element from penetrating into a gap between the pipe end sections. A compression of the pipe end sections is thus easier.

At the same time, the sealing element is prevented from being damaged by edges at the ends of the pipe end sections.

The insert sleeve does not thereby need to extend axially much further than the gap between the pipe end sections when the profiled clamp is not clamped.

In another preferred embodiment, the sealing element has an annular element on a radial inside, which annular element extends into a gap between the pipe end sections. The annular element is embodied in one piece or in two pieces with the sealing element. A stop is formed by this annular element and the ends of the pipe end sections are pressed axially against the annular element accordingly, a centering of the sealing element and thus a centering of the profiled clamp with respect to the pipe end sections takes place while providing an additional seal. A direct contact between the ends of the pipe end sections is also prevented, thus avoiding damage to these ends. The annular element can thereby be embodied in one piece or in two pieces with the sealing element, that is, it can either be arranged as an additional element on the inside of the sealing element or can be part of the sealing element.

The insertion of the pleats represents a relatively simple shaping, which permits the introduction of axial forces through which the pipe end sections are held axially or even are pressed towards one another. The axial forces are thereby applied with the aid of the profiled clamp or via the tilted side walls thereof, which touch the pleats. During the tightening of the profiled clamp, a compression of the sealing element thereby takes place at the same time, which ensures the necessary tightness of the connection. The profiled clamp is thereby positioned such that the sealing element is located symmetrically over the connection point of the pipe end sections. This can be achieved in that the pleats are shaped with the same distance to the respective end of the pipe end sections. In contrast to welded flanges, the pleats thereby represent a one-piece deformation of the pipe end sections, whereby there is no risk of leaks. The provision of perimeter pleats is thereby less complex than the production of the flanges as additional rotary parts, which also have to be fastened to the pipe end sections in a gas-tight manner. In total, therefore, a connecting assembly that can be produced in a very simple and cost-effective manner for the fluid-tight connection of two pipe end sections can thus be achieved.

Embodiments of the invention are directed to a connecting assembly that includes two pipe end sections arranged to face each other, a profiled clamp including a clamping band with a base and two tilted side walls with ends, and at least one perimeter pleat projecting outwards on each of the pipe end sections. The side walls are engagable with the pleats on sides of the pleats facing away from one another.

According to embodiments, the connecting assembly may further include an annular sealing element arranged between the two tilted side walls.

In accordance with other embodiments, the pipe end sections can have an identical diameter. Further, the pipe end sections may bear against one another at their front faces.

According to embodiments of the invention, in a tightened state of the clamping band, the ends of the side walls can be spaced apart radially from the pipe end sections.

According to other aspects of the embodiments, the sealing element can bears against the base and the side walls. The sealing element may have recesses in regions of the ends of the side walls. Further, the recesses are smaller than the pleats.

In accordance with still other aspects of the embodiments, a width of the base can be smaller than a distance between the pleats.

Moreover, the pleats can have a straight region running in the radial direction.

According to still other embodiments of the instant invention, the connecting assembly may further include an insert sleeve on a radial inside of the sealing element. The insert sleeve can be positionable to cover a gap between the pipe end sections.

In accordance with embodiments, the sealing element may have an annular element on a radial inside portion that extends into a gap between the pipe end sections. The annular element can be embodied in one piece or in two pieces with the sealing element.

Embodiments are directed to a method for producing a connection of two pipe end sections. The method includes positioning two pipe end sections to face each other, each of the pipe end sections having at least one pleat projecting radially outwards, locating a profiled clamp over the pleats, the profiled clamp including a clamping band having a base and two side walls, and adjusting an axial distance between the pleats through a radial movement of the sidewalls.

According to embodiments, the profiled clamp includes an annular sealing element arranged at an inner side of the profiled clamp.

In accordance with other embodiments, the method may also include pressing the pipe end sections radially and at the same time axially towards each other via the sidewalls while maintaining a radial spacing between open ends of the side walls and the pipe end sections.

According to still other embodiments, the adjusting can include tightening the clamping band so that the pleats slide along the side walls and move towards each other.

Further, the two side walls can extend obliquely from the base.

Embodiments are directed to a profiled clamp for connecting two pipe end sections, each of the pipe end sections having at least one perimeter pleat. The profiled clamp includes a clamping band having a base and two tilted side walls, an annular sealing element located between the two tilted side walls, and a recess formed between a part of the two tilted side walls and the annular sealing element to form a slide surface for the pleats.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
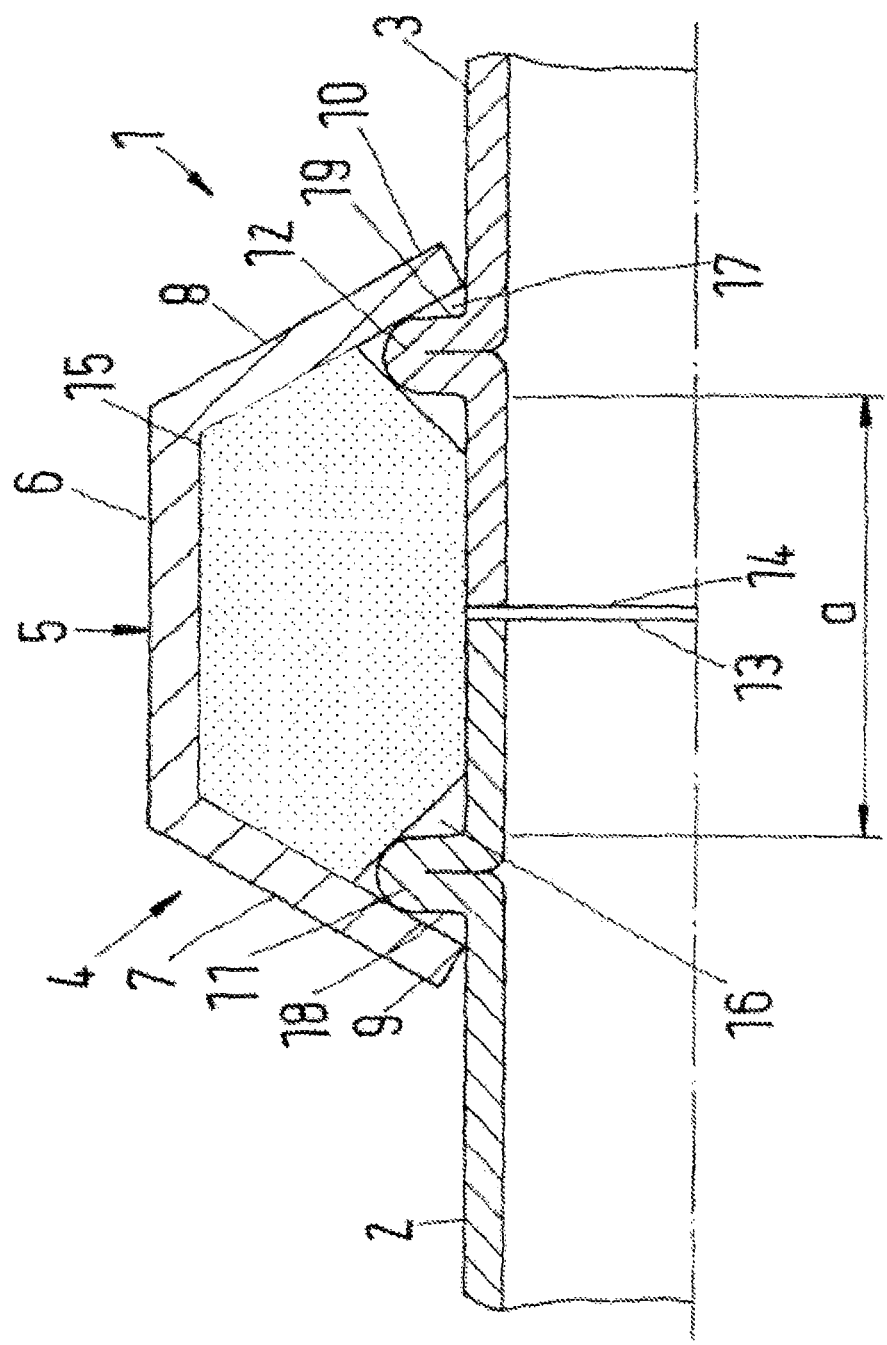
FIG. 1 illustrates a cross section of a connecting assembly in a diagrammatic representation.
Figure 1A:
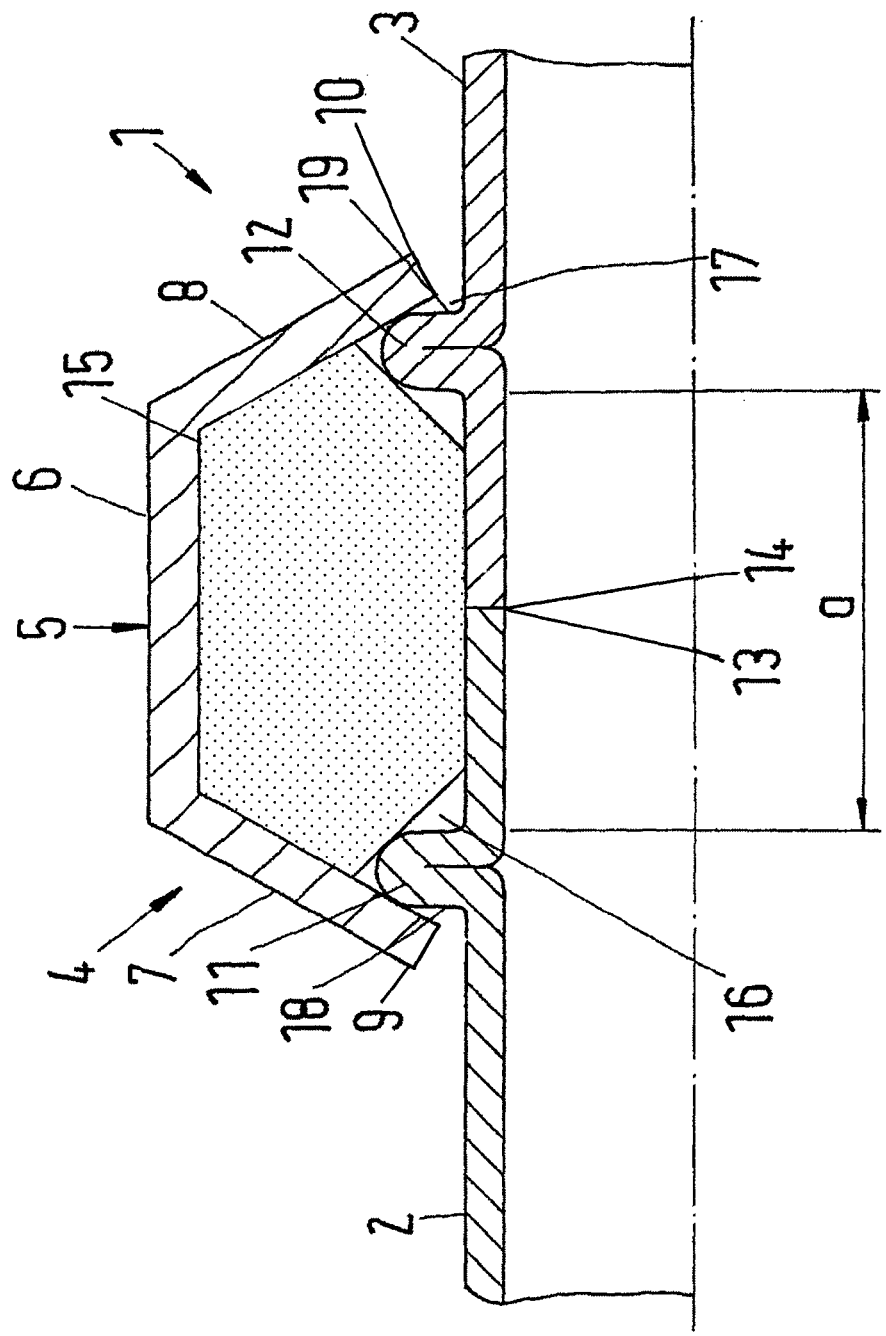
FIG. 1a illustrates a cross section of a connecting assembly in a diagrammatic representation.

FIG. 1 shows a connecting assembly 1 with two pipe end sections 2, 3 which are held together with the aid of a profiled clamp 4. The profiled clamp 4 has a clamping band 5, which has a base 6 and two side walls 7, 8. The design of profiled clamps is thereby assumed to be generally known.

Ends 9, 10 of the side walls 7, 8 respectively engage behind a pleat 11, 12, which are respectively arranged at a pipe end section 2, 3 in the region of an end 13, 14. The side walls 7, 8 of the profiled clamp 4 thereby bear against an outside of the pleats 11, 12 such that during the tightening of the profiled clamp 4 an axial force is exerted on the pleats 11, 12 via the side walls 7, 8. In this manner, axial forces press the pipe end sections 2, 3 towards one another. Although it is thereby desirable, but not absolutely necessary, that the ends 13, 14 of the pipe end sections 2, 3 can abut against one another on their front faces. Due to the compression of a sealing element 15, which is arranged in the profiled clamp 4 between the base 6 and the side walls 7, 8 a fluid-tight seal takes place between the pipe end sections 2, 3 outwards. The sealing element 15 is thereby radially compressed between the base 6 and the pipe end sections 2, 3 during the tightening of the profiled clamp 4.

The sealing element 15 has respectively one recess 16, 17 in the region of the ends 9, of the side walls 7, 8, into which the pleats 11, 12 penetrate during the tightening of the profiled clamp 4. So that a compression of the sealing element 15 also takes place, the recesses 16, 17 are thereby smaller than the pleats 11, 12.

The pleats 11, 12 are arranged at a distance "a" from one another, which is greater than the axial extension of the base 6. This ensures that axial forces can also always be exerted on the pleats 11, 12 via the side walls 7, 8. The pleats 11, 12 thereby extend in the radial direction such that they have straight regions 18, 19 running in the radial direction. Since the pleats are produced by material deformation, a radial outer edge of the pleats is always rounded so that a favorable bearing of the side walls 7, 8 against the pleats 11, 12 is ensured. The corresponding radial extension of the pleats 11, 12, thereby ensures that the ends 9, 10 of the side walls 7, 8 do not radially strike the pipe end sections 2, 3 during the tightening of the profiled clamp 4 and would thus prevent a further compression of the sealing element 15.

The pleats 11, 12 are thereby embodied symmetrically on the pipe end sections 2, 3 that is, respectively at half the distance "a" from the end 13, 14 of the pipe end section 2, 3. In a corresponding manner, the sealing element 15 always covers the connection point between the pipe end sections 2, 3.

The profiled clamp 4 can have different clamping devices, such as, for example, a clamping screw. However, for the sake of simplicity in explanation and understanding, the specifics of the clamping device are not illustrated.

Figure 2:
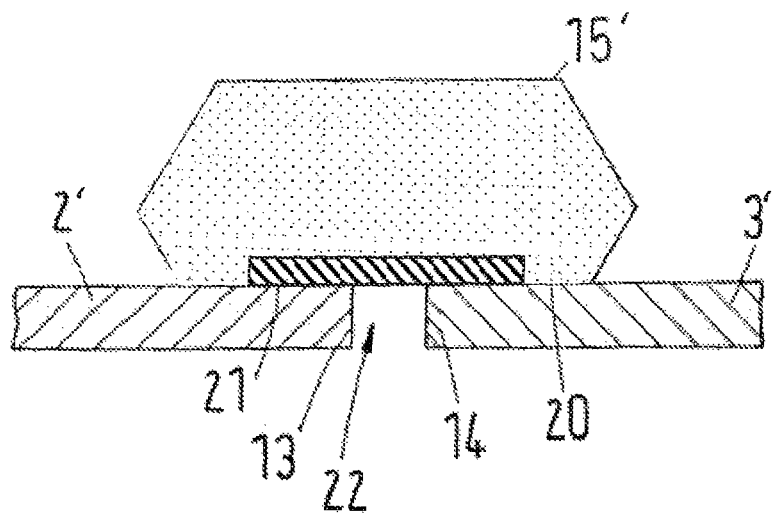
FIG. 2 illustrates a sealing element in a preferred embodiment.

In FIG. 2, the sealing element 15' is provided on a radial inside 20 with an insert sleeve 21, wherein the insert sleeve 21 bears against a radial outside of the pipe end sections 2', 3' and axially covers a gap 22 formed between the two pipe end sections 2', 3' or between the ends 13, 14 thereof. The insert sleeve 21 is thereby made of a relatively inelastic material, such as a metal, for example, and prevents the sealing element 15' from penetrating into the gap 22 during the tightening of the profiled clamp (not shown), which would prevent a compression of the pipe end sections 2', 3'. At the same time, the sealing element 15' is protected from damage in the region of the ends 13, 14 of the pipe end sections 2', 3'.

Figure 3:
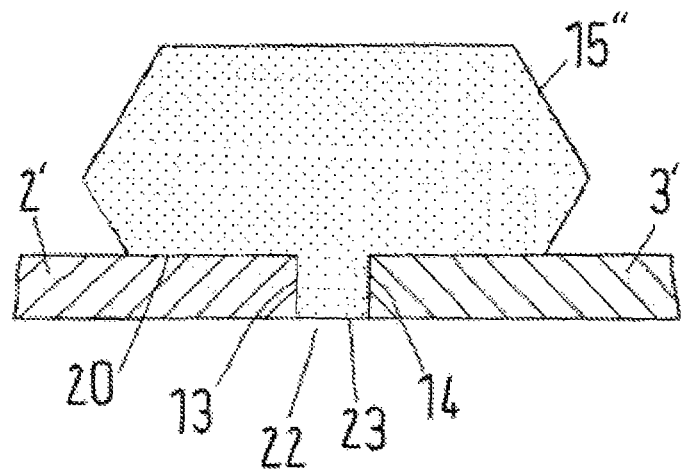
FIG. 3 illustrates the sealing element in a further embodiment.

FIG. 3 shows an embodiment of the sealing element 15", such that the sealing element 15" is embodied in one piece with an annular element 23. The annular element 23 thereby extends into the gap 22 between the pipe end sections 2', 3'. The ends 13, 14 of the pipe end sections 2', 3' thereby bear axially against the annular element 23, which thus prevents direct contact of the ends 13, 14 and in addition improves the sealing effect of the sealing element 15".

Instead of a one-piece embodiment of the annular element 23, as is shown in FIG. 3, the annular element 23 can also be embodied independently and arranged on the inside 20 of the sealing element 15.

Via the connecting assembly according to the invention, the two pipe end sections can be connected to one another in a fluid-tight manner without additional rotary parts, such as flanges, for example, being necessary, which have to be connected to the pipe end sections. Instead, a simple perimeter pleat is embodied in each pipe end section, which are used for axially securing in position with the aid of a profiled clamp. The profiled clamp at the same time is used to press a sealing element radially against the pipe end sections, whereby a connection point is sealed between the pipe end sections. The embodiment of the pleats thereby has the advantage that they are embodied in one piece with the pipe end sections, whereby no tightness problems occur. An additional sealing chamber is thereby not necessary, since the necessary room is provided by the profiled clamp. An axial and radial securing in position as well as a fluid-tight connection thus takes place in a simple manner.

The connecting assembly with two pipe end sections 2, 3 and a profiled clamp 4 has a clamping band 5 with a base 6 and two tilted side walls 7, 8, within which an annular sealing element 15 is arranged. The pipe end sections 2, 3 have a perimeter pleat 11, 12 projecting outwards respectively on their ends facing towards one another. Ends 9, 10 of the side walls 7, 8 engage behind the pleats 11, 12 on sides facing away from one another. The pipe end sections 2, 3 can have an identical diameter and in particular bear against one another at the front face. A distance a between the pleats 11, 12 may be selected such that ends 9, 10 of the side walls 7, 8 are spaced apart radially from the pipe end sections 2, 3. The sealing element 15 can bear against the base 6 and the side walls 7, 8, and has recesses 16, 17 in particular in the region of the ends 9, 10 of the side walls 7, 8. The recesses 16, 17 can be smaller than the pleats. Preferably a width of the base 6 is smaller than the distance a between the pleats 11, 12. The pleats 11, 12 may have a straight region 18, 19 running in the radial direction. In a preferred embodiment the sealing element 15 has an insert sleeve 21 on a radial inside, so as to axially cover a gap between the pipe end sections 2, 3. In another preferred embodiment the sealing element 15 has an annular element 23 on a radial inside, which is positionable to extend into a gap between the pipe end sections 2, 3. The annular element is embodied in one piece or in two pieces with the sealing element.

The pleat 11, 12 projecting outwards is made in each pipe end section 2, 3, so that a distance between the pleats 11, 12 is selected such that side walls 7, 8 of the profiled clamp 5 overlap the pleats 11, 12 and ends 9, 10 of the side walls 7, 8 are spaced apart radially from the pipe end sections 2, 3.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connecting assembly comprising:
   two pipe end sections arranged to face each other;
   a profiled clamp including a clamping band with a base and two tilted side walls with ends, wherein the base is arranged between the two tilted sidewalls in an axial direction;
   at least one perimeter pleat projecting outwards on each of the pipe end sections wherein the pleats have a straight region running in the radial direction and a rounded region radially outward the straight region; and
   an annular sealing element arranged between the two tilted side walls,
   wherein the side walls are engagable with the rounded region of the pleats on sides of the pleats facing away from one another, respectively,
   wherein each pleat is positioned at a distance from an end of its respective pipe end section,
   wherein, in an assembled state, an entire width of the base in the axial direction is smaller than a distance in the axial direction between the pleats on each of the pipe end sections,
   wherein in a tightened state of the clamping band the side walls abut against the rounded region of the pleats on sides of the pleats facing away from one another, and the sealing element abuts against the base and the side walls, and the sealing element having tapered walls that abut against the rounded region of the pleats on sides of the pleats facing towards one another,
   wherein the pipe end sections have an identical diameter, and
   wherein the pipe end sections face one another at their front faces.

2. The connecting assembly according to claim 1, wherein the pipe end sections bear against one another at their front faces.

3. The connecting assembly according to claim 1, wherein the sealing element has recesses in regions of the ends of the side walls.

4. The connecting assembly according to claim 3, wherein the recesses are smaller than the pleats.

5. The connecting assembly according to claim 1, further comprising an insert sleeve on a radial inside of the sealing element.

6. The connecting assembly according to claim 5, wherein the insert sleeve is positionable to cover a gap between the pipe end sections.

7. The connecting assembly according to claim 1, wherein the sealing element has an annular element on a radial inside portion that extends into a gap between the pipe end sections.

8. The connecting assembly according to claim 7, wherein the annular element is embodied in one piece or in two pieces with the sealing element.

9. The connecting assembly according to claim 1, wherein each pleat is formed having internal walls of the respective pipe end section in contact with one another at the pleat.

10. A method for producing a connection of two pipe end sections comprising:
    positioning two pipe end sections to face each other, each of the pipe end sections having at least one pleat projecting radially outwards, wherein each of the at least one pleat is positioned at a distance from an end of its respective pipe end section, and wherein the pleats have a straight region running in the radial direction and a rounded region radially outward the straight region,
    locating a profiled clamp over the pleats, the profiled clamp including a clamping band having a base and two side walls, wherein the base is arranged between the two tilted sidewalls in an axial direction and wherein the profiled clamp includes an annular sealing element arranged at an inner side of the profiled clamp; and
    adjusting an axial distance between the pleats through a radial movement of the sidewalls such that an entire width of the base in the axial direction is smaller than the distance in the axial direction between the respective at least one pleats,
    wherein in a tightened state of the clamping band the side walls abut against the rounded region of the pleats on sides of the pleats facing away from one another, respectively, and the sealing element abuts against the base and the side walls, and the sealing element having tapered walls that abut against the rounded region of the pleats on sides of the pleats facing towards one another,
    wherein the pipe end sections have an identical diameter, and
    wherein the pipe end sections face one another at their front faces.

11. The method according to claim 10, further comprising pressing the pipe end sections radially and at the same time axially towards each other by via the sidewalls.

12. The method according to claim 10, wherein the adjusting comprises tightening the clamping band so that the pleats slide along the side walls and move towards each other.

13. The method according to claim 10, wherein the two side walls extend obliquely from the base.

14. A profiled clamp connection comprising: two pipe end sections, each of the pipe end sections having at least one perimeter pleat, wherein the at least one pleat of each of the pipe end sections is positioned at a distance from an end of its respective pipe end section, and wherein the pleats have a straight region running in the radial direction and a rounded region radially outward the straight region;
    a clamping band having a base and two tilted side walls, wherein the base is arranged between the two tilted sidewalls in an axial direction, and wherein an entire width of the base in the axial direction is smaller than a distance in the axial direction between the respective at least one pleat of each of the pipe end sections;

an annular sealing element located between the two tilted side walls; and recesses formed between a part of the two tilted side walls and the annular sealing element to form a slide surface for the pleats, wherein in a tightened state of the clamping band the side walls abut against the rounded region of the pleats on sides of the pleats facing away from one another, respectively, and the sealing element abuts against the base and the side walls, and the sealing element having tapered walls that abut against the rounded region of the pleats on sides of the pleats facing towards one another, wherein the pipe end sections have an identical diameter, and wherein the pipe end sections face one another at their front faces.

\* \* \* \* \*